United States Patent [19]
Jenkins et al.

[11] 4,065,078
[45] Dec. 27, 1977

[54] AIRCRAFT UNDERCARRIAGE SUSPENSION

[75] Inventors: Stanley Frederick Noel Jenkins, Tarporley; Roy Fairclough, Warrington, both of England; Brian Arthur Howard, Hawarden, Wales; Frederick Miley, Widnes, England

[73] Assignee: Automotive Products, Leamington Spa, England

[21] Appl. No.: 663,436

[22] Filed: Mar. 3, 1976

[30] Foreign Application Priority Data

Mar. 19, 1975 United Kingdom ............... 11520/75

[51] Int. Cl.² .............................................. B64C 25/60
[52] U.S. Cl. ............................ 244/104 FP; 267/64 R
[58] Field of Search ................... 244/104 FP, 102 SS, 244/100 R; 267/64 R, DIG. 1; 188/297, 299; 280/709

[56] References Cited

U.S. PATENT DOCUMENTS

| 3,612,570 | 10/1971 | Pitcher et al. | 280/709 |
| 3,743,222 | 7/1973 | Smith | 244/104 FP |
| 3,888,436 | 6/1975 | Sealey | 244/104 FP |
| 4,004,762 | 1/1977 | Jenkins | 244/104 FP |

FOREIGN PATENT DOCUMENTS

819,164  10/1937  France ........................ 244/104 FP

*Primary Examiner*—Trygve M. Blix
*Assistant Examiner*—Charles E. Frankfort
*Attorney, Agent, or Firm*—Lawrence J. Winter

[57] ABSTRACT

An aircraft undercarriage suspension includes a liquid filled telescopic suspension strut and a gas spring. Liquid displaced by the strut into the gas spring is selectively directed through alternative flow restrictors, one of which is matched for optimum damping during aircraft landing and the other of which is matched for optimum damping during taxing. A ride control valve operates on the nose wheel undercarriage to control aircraft pitching, the ride control hydraulic system being separated from the damping oil by a floating piston.

21 Claims, 7 Drawing Figures

AIRCRAFT UNDERCARRIAGE SUSPENSION

BACKGROUND OF THE INVENTION AND DESCRIPTION OF PRIOR ART

This invention relates to aircraft undercarriages incorporating shock absorbing struts in which a resilient element, usually an enclosed quantity of gas, is loaded to absorb landing shocks by the action of liquid on a movable wall, the displacement of which varies the loading of the resilient element.

As well as absorbing the landing shocks, such aircraft undercarriages must also operate to smooth the ride of the aircraft during taxiing, and the desirable characteristics of the undercarriage are different in these two modes of operation. The absorption of landing shocks is the more important function of the undercarriage, such an undercarriage usually being designed to absorb the energy resulting from the vertical descent rate of the aircraft without causing excessive stresses in the structure and without causing the aircraft to bounce back into the air, but characteristics which are satisfactory under these conditions usually provide a hard ride during taxiing. Some attempts have been made to overcome this disadvantage and provide modified characteristics in the taxiing mode, but it is believed that previous proposals are not completely satisfactory in providing the best ride comfort with minimum induced airframe stresses during taxiing.

SUMMARY OF THE INVENTION

It is an object of the present invention to provide an aircraft undercarriage suspension in which satisfactory characteristics are provided for both absorbing landing shocks and producing a relatively smooth ride during taxiing.

According to one feature of the present invention, an aircraft undercarriage includes a suspension strut which supports at least part of the weight of the aircraft by a ground-contacting element, the strut including resilient means which absorb landing shocks by the action of liquid displaced by the strut acting on a movable wall, the movement of which varies the loading of the resilient means, wherein two flow paths are provided for the displaced liquid, each flow path including flow restricting means to provide damping, and a selector valve is operable to direct the displaced liquid selectively through one or the other of said flow paths by means responsive to aircraft landing so that one flow path is operative while the aircraft is landing and the other flow path is brought into operation when the aircraft is taxiing.

Preferably, time delay means are provided to delay the operation of the selector valve following initial movement of the ground contacting element relative to the aircraft structure on aircraft landing.

According to another feature of the invention, an aircraft undercarriage includes a suspension strut which supports at least part of the weight of the aircraft by a ground-contacting element, the strut including resilient means which absorb landing shocks by the action of liquid displaced by the strut acting on a first movable wall, the movement of which varies the loading of the resilient means, and ride control valve means, actuated by a ride control mechanism sensitive to displacement of the aircraft structure relative to the ground contacting element to connect the suspension strut selectively to a source of liquid pressure or a drain, wherein a second movable wall isolates the liquid acting on the first movable wall from the liquid supplied from the pressure source.

The ride control valve means may be operated mechanically or electrically and, in an aircraft undercarriage incorporating two damping flow paths for liquid as hereinbefore set forth, may be brought into action by the selector valve which selects one or the other of said flow paths.

BRIEF DESCRIPTION OF THE DRAWINGS

The invention will now be described by way of example and with reference to the accompanying drawings, of which.

PREFERRED EMBODIMENTS

Figure 1:
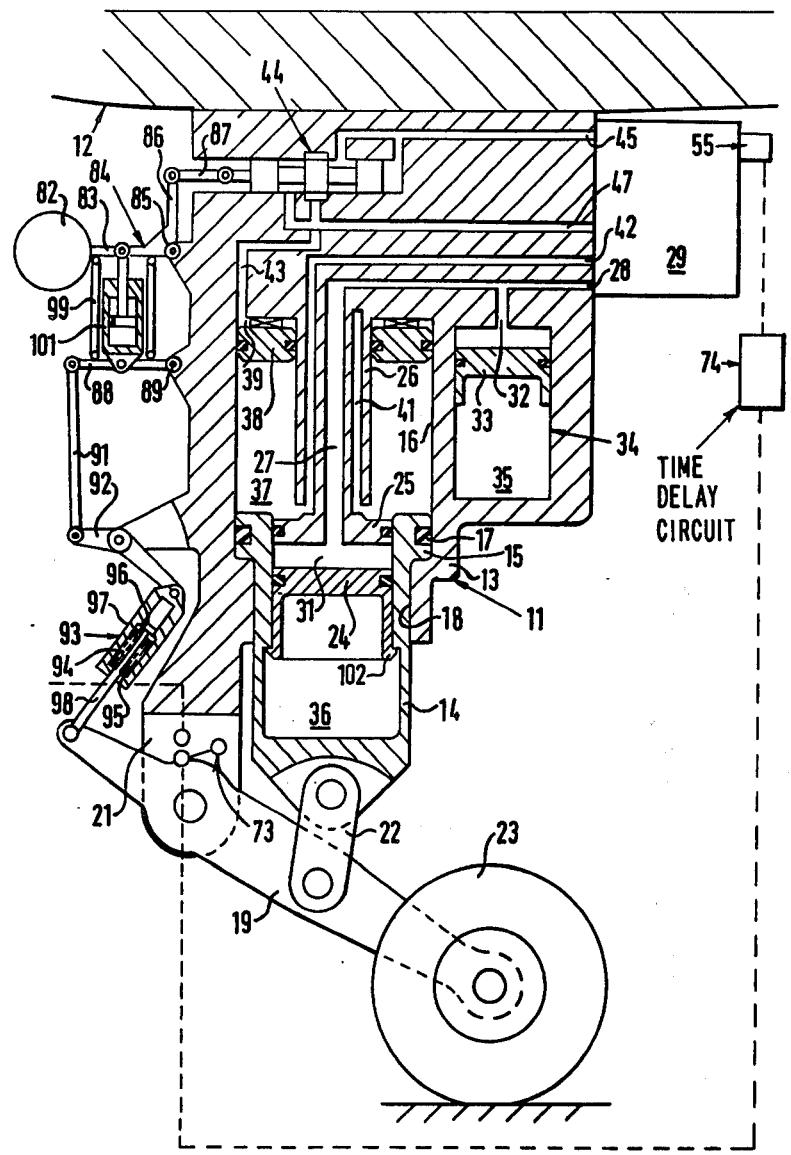
FIG. 1 is a part-sectional elevation of one embodiment of an aircraft undercarriage according to the invention.
Figure 2:
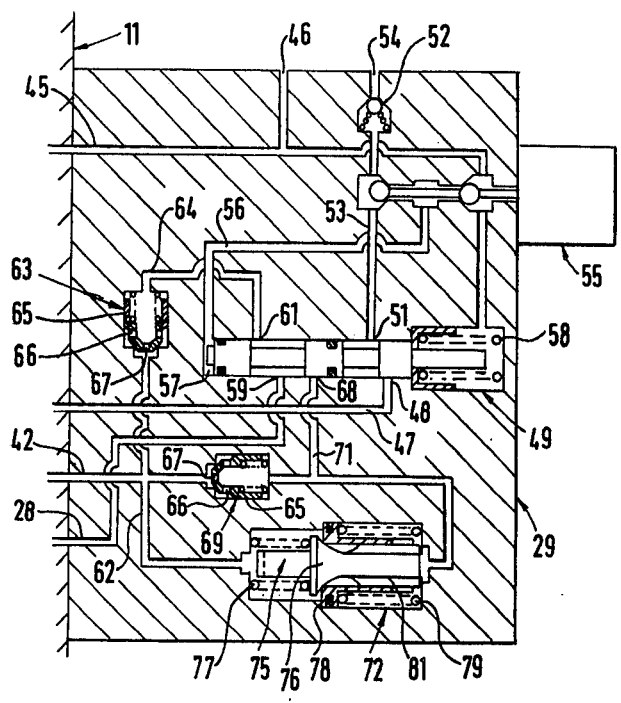
FIG. 2 is an enlarged cross-section of a valve block shown in FIG. 1.

Referring to FIG. 1 and FIG. 2, an aircraft undercarriage includes a telescopic strut 11 suspended from an aircraft fuselage structure 12. The strut 11 comprises a fixed housing 13 and a cylinder 14 having an external flange 15 at one end which slides in the large diameter bore portion 16 of a stepped bore in the housing 13 and incorporates a seal ring 17, the main body of cylinder 14 being guided by the smaller diameter portion 18 of the stepped bore. An arm 19 is pivotably connected to the strut housing 13 by a bracket 21, is connected to the other end of the cylinder 14 by a pivoted link 22, and carries a ground wheel 23 at its end furthest from the bracket 21.

The cylinder 14 is bored out to house a floating piston 24 and a fixed piston 25 which is on one end of a rod 26 extending from the strut housing 13 co-axially with the larger bore portion 16. A central passage 27 in the rod 26 connects with a passage 28 leading to a valve block 29 to connect a chamber 31 in cylinder 14 defined between the floating piston 24 and the fixed piston 25 to the valve block 29 and via a branch passage 32 to one side of a piston 33. The piston 33 acts as a movable wall against resilient means consisting of a quantity of nitrogen gas in the chamber 35 to form one gas spring to supplement another gas spring formed by the floating piston 24 acting on another quantity of nitrogen gas in a chamber 36 on the opposite side of piston 24 to the chamber 31.

Above the fixed piston 25 and the flange 15 of cylinder 14, the space defined by the larger diameter bore portion 16 is divided into one annular chamber 37 below an annular floating piston 38 and another annular chamber 39 above the annular piston 38. The chamber 37 is connected to the valve block 29 by an annular passage 41 in the rod 26 and a passage 42 in the strut body and the chamber 39 is connected to a passage 43 to a spool valve 44 forming part of a ride control mechanism. The spool valve 44 is served by a passage 45 connecting to the valve block 29 and a drain port 46 in the valve block 29 (FIG. 2) and by a passage 47 connecting to a port 48 of a spool-type selector valve 49 in the valve block 29. In the position shown in FIG. 2, the spool of the selector valve is blocking the port 48 from a pressure inlet port 51 which is itself connected via a non-return valve 52 and a passage 53 to a port 54 connected to the pressure side of the main hydraulic system of the aircraft. Hence the spool valve 44 is inoperative and no pressure reaches the chamber 39.

The selector valve 49 is controlled by a solenoid valve 55 via a passage 56 which connects to a chamber 57 at one end of the spool of the selector valve 49. When the solenoid of solenoid valve 55 is de-energised, chamber 57 is connected to drain port 46 via passage 56 and 45 and the spool of the selector valve 49 is biassed into the position shown in FIG. 2 by a coil spring 58 acting on the other end of the spool to chamber 57. In this position, two further ports 59 and 61 in the selector valve 49 are connected together so that the annular chamber 37 is connected via annular passage 41 and passage 42 to the passage 28 by a flow path provided by a passage 62, a landing/recoil orifice 63 and a passage 64 connecting the landing/recoil orifice 63 to port 61.

The landing/recoil orifice is functionally similar to those found in conventional aircraft undercarriages and comprises a spring-loaded valve member 65 which unseats to allow oil to flow through ports 66 in the valve member 65 when oil is displaced from the annular chamber 37 during upward movement of the strut cylinder 14 relative to the fuselage structure 12 when the aircraft lands but which allows flow in the reverse direction only through a restrictor 67 when the strut 11 recoils.

Energising the solenoid of solenoid valve 55 causes pressure to be transmitted to the chamber 57 through passage 56 to move the spool of selector valve 49 against the spring 58 to open port 48 to the pressure inlet port 51, block port 61 to prevent flow through the landing/recoil orifice 63 and to unblock a port 68 which is thus opened to the port 61. The pressure at port 48 is transmitted through passage 47 to render the ride control spool valve 44 operative. Unblocking port 68 brings in another flow path for oil displaced from the strut chamber 37 by allowing the oil to flow through a taxiing orifice 69 and a passage 71, and, under certain conditions, through a relief valve 72 arranged in parallel with the taxiing orifice 69.

The solenoid of the solenoid valve 55 is energised automatically after the aircraft lands by the action of a microswitch 73 on the bracket 21 which is operated by the arm 19 when the strut 11 is compressed by the weight of the aircraft reacted by wheel 23. The supply to the microswitch is pre-selected by the aricraft pilot and the output is taken through a time delay circuit 74 to the solenoid, the time delay preventing energisation of the solenoid until the strut 11 has absorbed the vertical component of the aircraft decent velocity. The landing/recoil orifice 63 is designed specifically for the landing mode of operation of strut 11 according to current aircraft design practice. The taxiing orifice 69 is similar in mechanical arrangement to the landing/recoil orifice with appropriate adjustments to the size of the ports 66 and the restrictor 67 to give a softer ride uncompromised by the landing requirements. A typical design parameter for the taxiing orifice is 0.3 critical damping for strut compression (wheel 23 moving towards the fuselage structure 12) and 1.0 critical damping for strut extension. The relief valve 72 is double acting to provide 1.0 critical damping at wheel to fuselage velocities of ± 0.5 meters/sec. It comprises a valve member 75 having a frustro-conical section 76 which is seated by a spring 77 onto seat formed at one end of a cylinder 78 which slides in the larger diameter portion of a stepped bore in the valve block 29. Another spring 79, whose fitted load is greater than that of spring 77, urges the cylinder 78 into abutment with the step in the stepped bore. The valve member 75 has a fluted stem 81 which is guided by the bore of cylinder 78 and is of such length that when the frustro-conical section is seated on the cylinder 78 and the cylinder 78 abuts the step in the stepped bore, as shown in FIG. 2, the end of the fluted stem 81 has only a small clearance with the end wall stepped bore. When the pressure in passage 42 exceeds that in passage 71 by more than a certain amount, the cylinder 78 is moved away from the frustro-conical section 76 of the valve member 75, compressing the spring 79 and permitting oil to bypass the taxiing orifice 69. Similarly, when the pressure in passage 71 exceeds that in passage 42 by more than a certain amount, the frustro-conical section 76 moves away from the cylinder 78, compressing spring 77 and again permitting oil to bypass the taxiing orifice 69.

The ride control spool valve 44 is actuated by a ride control mechanism comprising a mass 82 on the end of a horizontal arm 83 of a bell crank 84 which pivots on the strut 11 by a pin 85 and has the end of its other, vertical, arm 86 connected to the valve spool by a pivotable link 87. A horizontally-disposed lever 88 has one end which pivots on the strut 11 by a pin 89 and the other end pivotably connected to a vertical link 91 which is pivotably connected at its other end to one end of a boomerang lever 92. The boomerang lever 92 relays movement of the arm 19 to the arm 88 as the wheel 23 moves towards and away from the aircraft fuselage structure 12, this movement being transmitted by a spring-box link 93 which pivots on the other end of boomerang lever 92 and the other end of arm 19 to that carrying the wheel 23. The movement of arm 88 is transmitted to the bell crank 84 by a spring 99 and dashpot 101.

The spring-box link 93 comprises a precompressed coil spring 94 which urges apart two washers 95, 96 against abutments formed by steps in the bore of a cylinder 97 and steps on the outer diameter of a plunger 98. The steps which form the abutments for each washer are in the same plane so that linear movement of the plunger 98 relative to the cylinder 97 in either direction causes further compression of spring 94.

The strut 11 is shown in the ready-to-land configuration in FIG. 2. During taxiing, when the wheel 23 is bearing some of the aircraft weight, the cylinder 14 moves to a mean position where the flange 15 is partway along the large diameter bore portion 16, which mean position is maintained by the ride control spool valve 44 directing oil through passage 43 to chamber 39 to move the annular piston 38 towards the fixed piston 25 to compensate for the variations in the volumes of chambers 35 and 36 with the weight carried by wheel 23.

The connections between the arm 19 and spool valve 44 by the spring-box link 93, boomerang arm 92, vertical link 91, arm 88, spring 99 and dashpot 101, bellcrank 84 and link 87 are such that when the spool of valve 44 is in its central or lap position, the cylinder 14 is in its mean position as described with the aircraft stationary on the ground. An increase in the static load on wheel 34 compresses the strut 11 so that arm 19 is moved anticlockwise, and the boomerang arm 92, arm 88 and bellcrank 84 all move clockwise to move the link 87 and spool towards the valve block 29. This allows oil under pressure from passage 47 to enter chamber 39 through passage 43 to move the annular piston further towards the fixed piston 25 and so extend the strut. Extension of the strut restores the valve spool to the lap position, isolating the oil in chamber 39. Similarly, a reduction in the static load on wheel 34 causes the strut 11 to extend to move arm 19 clockwise and the spool of spool valve 44 away from valve block 29. This allows a quantity of oil from chamber 39 to escape through passages 43 and 45, so compressing the strut and restoring the spool to the lap position.

The spring-box link 93 acts as a rigid strut over normal taxiing movements of the arm 19 away from the normal static position, but for extremes of movement, such as occur during landing and take-off, the spring 94 is compressed owing to a relatively limited movement allowed by the bell crank 84. The arrangement of the bell crank 84, mass 82, spring 99, dashpot 101 and lever 88 functions in the manner of the ride control mechanism described in U.S. Pat. No. 3,612,570. The mass 82, spring 99 and dashpot 101 are chosen so that the damped natural frequency of oscillation of the bellcrank 84 about its pivot is substantially the same as the bounce frequency of the aircraft when taxiing on wheel 23. The effect is for low frequency changes in the vertical load on wheel 23, such as occur during braking of the aircraft, the spool of valve 44 is moved to add more oil to chamber 39 or allow oil to escape. For high frequency changes in the vertical load on wheel 23, such as occur during taxiing at speed, the mass 82 remains stationary relative to the fuselage structure 18 so that spool of valve 44 remains stationary and no oil is added to or allowed to drain from chamber 39.

The floating piston 38 acts as a removable wall to isolate the damping oil in chambers 37 and 31 and the various passages connecting them from the oil in chamber 39 and other parts of the ride control. The selector valve 49 maintains this isolation, since at no time are any of ports 59, 61 or 68 associated with the damping oil connected to the ports 48 and 51 which are associated with the ride control. The total volume of damping oil is constant, so that after aircraft take-off the annular piston 38 is forced upwards into abutment with the end of the bore portion 16 as shown in FIG. 1. The floating piston 24 is provided with a flange 102 which can abut a step in the bore of strut cylinder 14. This enables chamber 36 to be charged with gas to a higher pressure than chamber 35 to give a more favourable total gas pressure/gas volume characteristic during landing.

Figure 3:
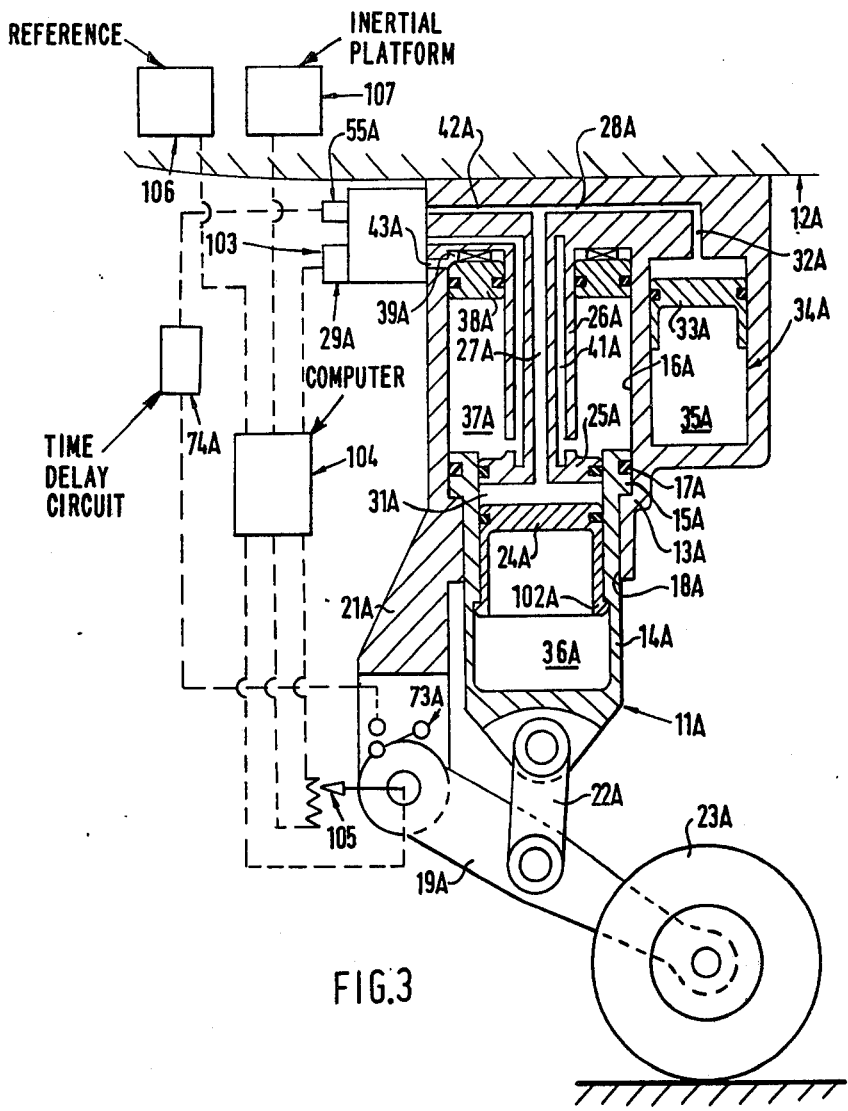
FIG. 3 is a part-sectional elevation of a second embodiment of an aircraft undercarriage according to the invention.
Figure 4:
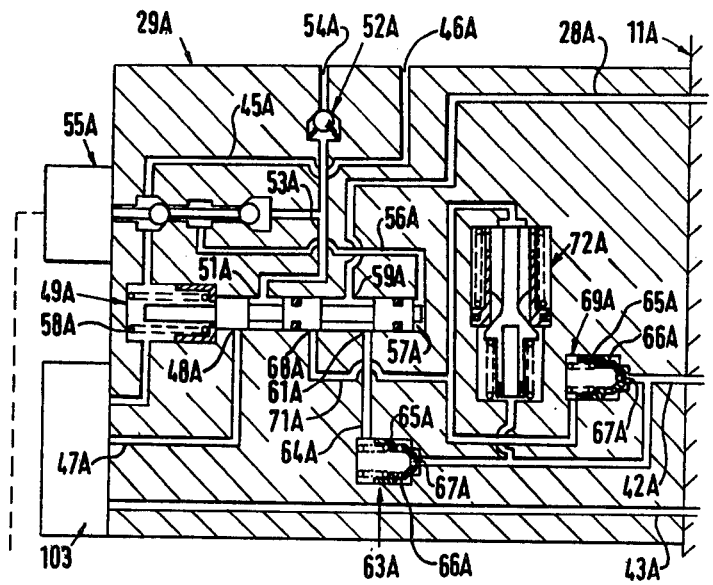
FIG. 4 is an enlarged cross-section of a valve block shown in FIG. 3.

The undercarriage shown in FIG. 3 and FIG. 4 is almost identical in most respects to that shown in FIG. 1 and FIG. 2, except that the ride control is electro-hydraulic instead of hydro-mechanical. Where appropriate, identical references to those used in FIG. 1 and FIG. 2 are used with a suffix A to relate FIG. 3 and FIG. 4 with the foregoing description. The following description will concentrate on those features of FIG. 3 and FIG. 4 which differ from FIG. 1 and FIG. 2.

The annular chamber 39A above the annular piston 38A is connected by passage 43A to the output of an electro-hydraulic servo valve 103 attached to the valve block 29A. The electro-hydraulic servo valve 103 is selectively supplied with oil under pressure by passage 47A from port 48A of the selector valve 49A and has a connection to the drain passage 45A. A computer 104 is fed with signals from a rotary potentiometer 105, sensing relative movement of the arm 19A relative to the strut 11A, a reference signal from a reference source 106 and from an inertial platform 107 in the fuselage structure 12A, sensing fuselage accelerations. Conveniently, when the undercarriage is a nose wheel undercarriage, the inertial platform 107 is the same component as is normally provided for navigational equipment and/or pitch and yaw indicators.

The computer 104 utilises the signals from the potentiometer 105, the reference 106 and the inertial platform 107 to provide an output to the electro-hydraulic servo valve 103 which is analogous to the movement of the bellcrank 84 which operates the ride control valve 44, so that during taxiing the annular floating piston 38A is moved in the same way as piston 38.

The undercarriage shown in FIGS. 1 and 2 and in FIGS. 3 and 4 are particularly for use as the nose undercarriage unit in an aircraft having the usual tricycle layout of undercarriage units where the ride control mechanism enables the undercarriage to adapt to the large variations in wheel load caused by pitching of the aircraft during taxiing on rough airfields or during braking. In the undercarriage shown in FIGS. 5–7 there is no ride control mechanism, this undercarriage being particularly for use as a main undercarriage unit which, being near the centre of gravity of the aircraft, is not subject to pitch accelerations to the same extent as the nose undercarriage.

Figure 5:
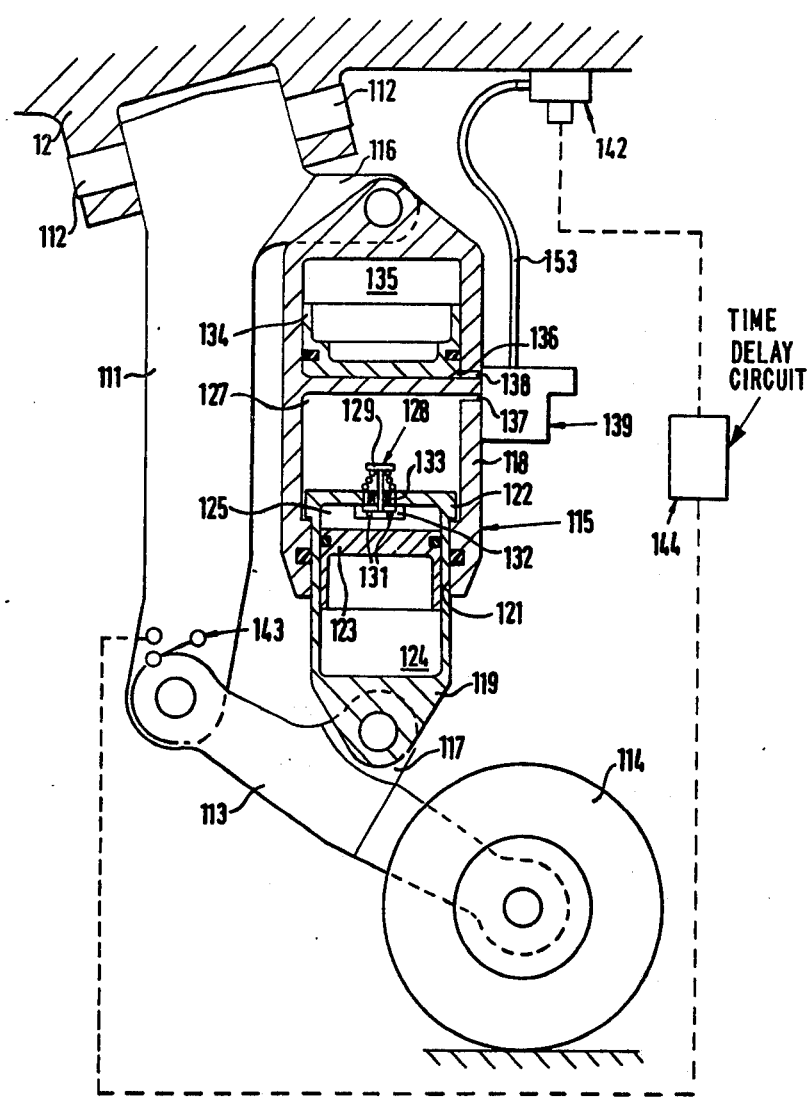
FIG. 5 is a part-sectional elevation of a third embodiment of an aircraft undercarriage according to the invention.
Figure 6:
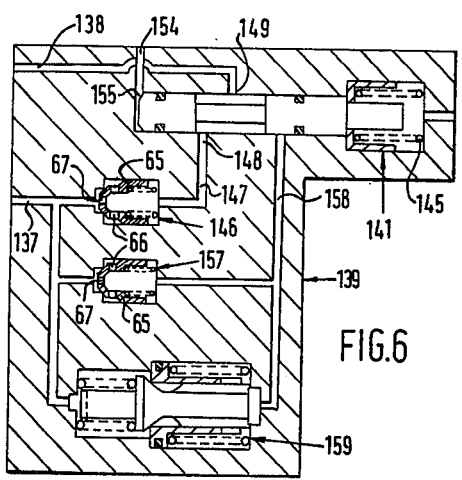
FIG. 6 is an enlarged cross-section of a valve block shown in FIG. 5.
Figure 7:
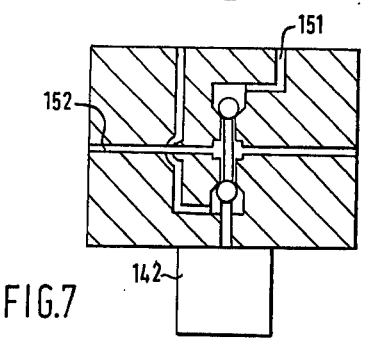
FIG. 7 is an enlarged cross-section of a pilot valve shown in FIG. 5.

Referring to FIGS. 5–7, a support arm 111 is pivotably mounted on the fuselage structure 12 by trunnions 112 and is supported in the position shown in FIG. 5 by a stay (not shown). An arm 113 is pivoted at one end to the lower end of the support arm 111 and carries a ground wheel 114 at its other end. A telescopic strut 115 is pivotably mounted at one end to a lug 116 projecting from the support arm 111 near its trunnions 112 and at the other end to a lug 117 on the arm 113.

The strut 115 comprises an outer cylinder body 118 and an inner cylinder body 119 which slides in the small diameter portion 121 of a stepped bore in the outer body 118. A flange 122 at the end of the inner cylinder body 119 limits the movement of wheel 114 away from the fuselage structure 12 by contacting the step in the bore of body 118. The inner body 119 is bored out to provide a gas spring comprising a floating piston 123 dividing the space inside the cylinder body 119 into a chamber 124 containing oil and a chamber 125 charged with nitrogen gas. Above the chamber 125 the cylinder body 119 incorporates an end wall 126 to separate chamber 125 from a chamber 127 in the outer cylinder body 118. A landing/recoil orifice 128 is provided in the end wall 126 to allow passage of oil from chamber 127 to chamber 125 when the cylinder body 119 is moved towards and away from the fuselage structure 12 and comprises a spring loaded valve member 129 having a valve head 132 with restrictors 131 which restrict the flow from chamber 125 to chamber 127. For flow from chamber 127 to chamber 125 the valve head 132 lifts against the spring load to allow a less restricted flow through ports 133.

A second gas spring is provided in the cylinder body 118 and comprises a floating piston 134 separating a chamber 135 charged with nitrogen gas and a liquid chamber 136. The chamber 127 communicates with chamber 136 by passages 137 and 138 and a valve block 139. In the valve block 139 communication between passages 137 and 138 is controlled by a spool-type selector valve 141 which in turn is controlled by a solenoid valve 142. The solenoid valve 142 is similar to solenoid valves 55 and 55A and is energised from a microswitch 143 and time delay circuit 144 in the same way as solenoid 55 is energised by the microswitch 73 and time delay circuit 74. When the solenoid of the solenoid valve 142 de-energised, the selector valve 141 is positioned as shown in FIG. 6, with the spool biassed towards the strut cylinder body 118 by a spring 145. This allows oil from passage 137 to flow through a flow path comprising a second landing/recoil orifice 146, a passage 147, ports 148 and 149 in the selector valve 141 to passage 138. The second landing/recoil orifice 146 is similar in construction to the landing/recoil orifice 63 and provides a restriction on the flow from chamber 127 to chamber 136 which is matched with the restriction provided by the landing/recoil orifice 128 on the flow from chamber 127 to chamber 125 for the landing mode of operation of the undercarriage.

For taxiing, the solenoid of solenoid valve 142 is energised to allow oil under pressure from the main hydraulic system of the aircraft to flow from a port 151 and a passage 152 in the body of valve 142, through a hose 153 to a passage 154 in the valve block 139 and to a chamber 155 where it acts on the end of the spool of the selector valve 141 to move the spool away from the strut cylinder body 118 against the spring 145. This blocks port 148 and opens a third port 156 to port 149 to provide a flow path from passage 137 through a taxiing orifice 157 and passage 158 to passage 138. This taxiing orifice 157 is similar in construction to the taxiing orifice 69 and is matched with the two gas springs and the landing/recoil orifice 128 to give similar damping characteristics to those provided by the undercarriage shown in FIGS. 1 and 2 when in the taxiing mode. A relief valve 159 of similar construction to the relief valve 72 is in parallel with the taxiing orifice 157 to provide for high wheel to fuselage velocities over rough ground.

A port 161 in the solenoid valve 142 is connected to the drain side of the aircraft hydraulic supply to allow oil to escape from chamber 155 when the solenoid is de-energised. The solenoid valve 142 is used to control an identical strut to the strut 115 in the other main undercarriage unit of the aircraft, passage 152 being extended to connect to a similar hose to hose 153.

In each of the embodiments of the invention described above, the flow path for the displaced liquid includes one or the other of the flow restricting means constituted by a landing/recoil orifice and a taxiing orifice. Alternative flow paths may be provided by other arrangements of the flow restricting means. For example, two orifices may be used in parallel in one mode of undercarriage operation and in series in the other mode. A second alternative is two orifices in parallel in one mode with one orifice blocked by a selector valve in the other mode and a third alternative would be two orifices in series in one mode with one orifice by-passed by a selector valve in the other mode.

We claim:

1. An aircraft undercarriage for supporting an aircraft structure comprising:
a ground contacting element;
a variable length liquid-filled strut operatively connected to the aircraft structure and the ground contacting element to support a proportion of the weight of the aircraft structure;
resilient means for controlling the length of said strut in dependence on the load supported thereby;
a first liquid-filled chamber in said strut from which liquid is displaced by upward movement of the ground contacting element relative to the aircraft structure;
a second liquid-filled chamber closed by a movable wall acting on said resilient means in a direction to increase the load thereon under the pressure of liquid displaced from said first chamber;
a valve block;
first and second flowpaths defined by the valve block connecting said first chamber and said second chamber;
first flow restricting means in said first flow path and second flow restricting means in said second flow path to damp movement of the ground contacting element relative to the aircraft structure;
a selector valve in the valve block operable to direct the displaced liquid selectively through each of said flow paths;
and means responsive to aircraft landing to control said selector valve such that said first flow path is operative while the aircraft is landing and the second flow path is brought into operation when the aircraft is taxiing.

2. The aircraft undercarriage of claim 1 wherein said means responsive to aircraft landing comprise a switch operated by movement of the ground contacting element relative to the aircraft structure.

3. The aircraft undercarriage of claim 2 wherein a time delay circuit is connected between the switch and the selector valve.

4. The aircraft undercarriage of claim 1 further comprising a relief valve connected in parallel with said second flow restricting means.

5. The aircraft undercarriage of claim 4 wherein said relief valve is double acting.

6. The aircraft undercarriage of claim 1 further comprising a third flow path in said valve block for said displaced liquid, further resilient means, and a further movable wall acting on said further resilient means in a direction to increase the load thereon under the pressure of liquid displaced by said strut.

7. The aircraft undercarriage of claim 1 further comprising ride control valve means for connecting said strut selectively to a source of liquid pressure or a drain and a ride control mechanism, connected to said ride control valve means and controlled by sensing means sensitive to displacement of the ground contacting element relative to the aircraft structure.

8. The aircraft undercarriage of claim 7 wherein said means responsive to aircraft landing operate to inhibit operation of said ride control valve means during aircraft landing.

9. The aircraft undercarriage of claim 8 wherein said selector valve isolates the ride control valve from the liquid pressure source when said selector valve is moved to direct said displaced liquid through said first flow path.

10. The aircraft undercarriage of claim 7 further comprising another movable wall in said strut to isolate said displaced liquid from the liquid supplied from the pressure source.

11. The aircraft undercarriage of claim 7 wherein said ride control mechanism comprises a mass suspended so that vertical movement of the mass relative to the aircraft structure operates said ride control valve means, and a spring in parallel with a dashpot connecting the mass to the ground contacting element.

12. The aircraft undercarriage of claim 11 wherein a spring-box link connects the spring and dashpot to the ground contacting element, said spring-box link comprising a preloaded spring which is strained during excessive movement of the ground contacting element relative to the aircraft structure.

13. The aircraft undercarriage of claim 7 wherein said ride control valve means comprises an electrohydraulic servo valve.

14. An aircraft undercarriage for supporting an aircraft structure comprising:
 a ground contacting element;
 a variable length liquid filled strut operatively connected to the aircraft structure and the ground contacting element to support a proportion of the weight of the aircraft structure;
 resilient means for controlling the length of said strut in dependence on the load supported thereby;
 a first movable wall acting on said resilient means in a direction to increase the load thereon under the pressure of the liquid displaced by said strut;
 a liquid pressure source and a liquid drain;
 ride control valve means to selectively connect said strut to said source and said drain;
 sensing means sensitive to displacement of the ground contacting element relative to the aircraft structure;
 a ride control mechanism operatively connected to said ride control valve means and to said sensing means;
 and a second movable wall in said strut to isolate said displaced liquid from the liquid supplied from the pressure source.

15. The aircraft undercarriage of claim 14 wherein means responsive to aircraft landing operate to inhibit operation of said ride control valve means during aircraft landing.

16. The aircraft undercarriage of claim 15 wherein said means responsive to aircraft landing comprise a switch operated by movement of the ground contacting element relative to the aircraft structure.

17. The aircraft undercarriage of claim 16 wherein said switch controls a selector valve operative to isolate said ride control valve from said liquid source.

18. The aircraft undercarriage of claim 17 wherein a time delay circuit is connected between said switch and the selector valve.

19. The aircraft undercarriage of claim 14 wherein said ride control mechanism comprises a mass suspended so that vertical movement of the mass relative to the aircraft structure operates said ride control valve means, and a spring in parallel with a dashpot connecting the mass to the ground contacting element.

20. The aircraft undercarriage of claim 19 wherein a spring-box link connects the spring and dashpot to the ground contacting element, said spring-box link comprising a preloaded spring which is strained during excessive movement of the ground contacting element relative to the aircraft structure.

21. The aircraft undercarriage of claim 14 wherein said ride control valve means comprises an electrohydraulic servo valve.

* * * * *

UNITED STATES PATENT OFFICE
CERTIFICATE OF CORRECTION

Patent No. 4,065,078                     Dated December 27, 1977

Inventor(s)  JENKINS ET AL.

It is certified that error appears in the above-identified patent and that said Letters Patent are hereby corrected as shown below:

change the assignee to read AUTOMOTIVE PRODUCTS LIMITED.

Signed and Sealed this

Third Day of October 1978

[SEAL]

Attest:

RUTH C. MASON
Attesting Officer

DONALD W. BANNER
Commissioner of Patents and Trademarks